Feb. 10, 1970  A. QUENOT  3,494,569
TAPE MEASURE
Filed June 10, 1968
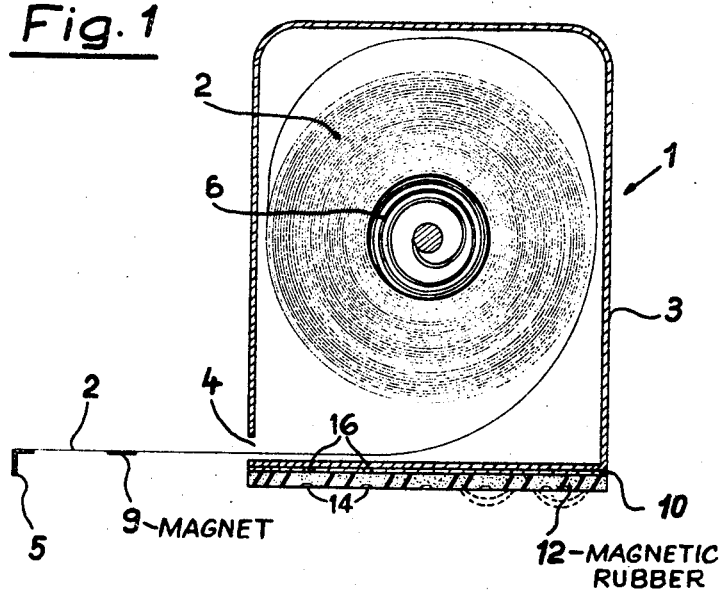
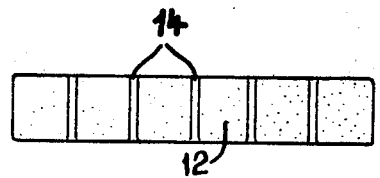
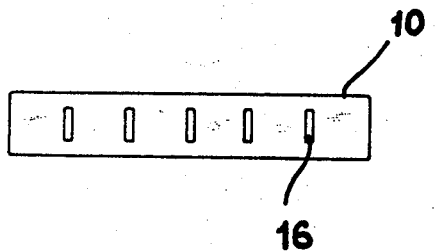

United States Patent Office 3,494,569
Patented Feb. 10, 1970

3,494,569
TAPE MEASURE
André Quenot, Boite Postale 256,
25 Besancon, Doubs, France
Continuation-in-part of application Ser. No. 575,691,
Aug. 29, 1966. This application June 10, 1968, Ser. No. 735,693
Claims priority, application France, Jan. 31, 1966, 47,813
Int. Cl. B65h 75/16
U.S. Cl. 242—84.8           5 Claims

ABSTRACT OF THE DISCLOSURE

In a portable tape measure casing a magnet extending substantially along the entire length of the base is constituted by a sheet of ferro-magnetic metal having on its outside surface magnetic particles, for example ferritic particles secured thereto by vulcanized rubber. The magnetic field is shunted by the sheet of metal so that it does not penetrate the interior of the casing and hence does not magnetize the tape if formed of magnetizable material.

---

This application is a continuation in part application of my previous application Ser. No. 575,691 filed on Aug. 29, 1966, now abandoned.

The invention is concerned with improvements in tape measure casings for tapes which can be of several meters in length. Such tape measures comprise generally a flexible tape for example of steel, wound on the drum inside the casing, the tape being extracted from the casing through an outlet in the latter and through which overhangs the free end of the tape.

It has already been proposed in the prior art, for example in U.S. Patent No. 3,036,791 to make magnetic tape holders. However in the prior art no means have been devised for preventing the magnets on the casing from magnetizing the ferro-magnetic tape contained therein. Magnetization of the tape is undesirable as it can occasion the adherence and the introduction into the casing of all kinds of ferrous dust as well as other dust particles laden with static electricity. These foreign bodies accelerate the deterioration of a measuring tape in various ways, by marring the graduations thereon or scratching the same.

To avoid the above indicated problem, the present invention provides means for mounting a magnet on the portable tape measure casing which does not cause unwanted magnetizing of the tape, and wherein the strength of the magnet can be as great as desired. The same means also provide anti-skid means for the casing.

The invention will be better understood by referring to the following description thereof made by way of non-limiting example and to the accompanying drawing in which:

FIGURE 1 is a cross sectional view of one embodiment of the invention.

FIGURE 2 is a bottom view of an anti-skid magnet support according to the invention and FIGURE 3 is a top plan view of the support shown in FIGURE 2.

The tape measure 1 comprises a tape, for example of steel, wound inside a casing 3 suitably made of plastic material. Tape 2 emerges from casing 3 through an opening 4 and is prevented from going in completely by means of a terminal hook 5 which also serves to pull out the tape. A return spring 6 rewinds tape 2 inside the casing when tape 2 is no longer held. There can also be provided a brake (not shown) acting in known manner to prevent rewinding of the tape.

Casing 3 bears magnetic means on its base. These means comprise a sheet of ferro-magnetic material such as steel 10 secured in any manner to the base of the casing or embedded therein and ferrite particles secured on the base outside the plate 10 by means of vulcanized rubber 12. These ferrite particles are so arranged as to form a plurality of small magnets having outwardly facing alternate North and South poles between which flux lines are set up as shown in FIGURE 1. The provision of the metal plate 10 prevents lines of force from reaching the interior of the casing, because the flux emerging from the inner poles of said magnets are shunted by the sheet 10 connecting all said inner poles. In this manner all metallic parts of the measuring device, in particular the tape, if it is made of metal, remain free of magnetization and no dust will enter the casing or being held in the casing by magneto-static attraction. Simultaneously the magnetic force created by said arrangement of small magnets is stronger than with usual magnets because the whole useful flux is concentrated in front of the outer poles, there is practically no leaking or stray flux. The use of vulcanized rubber as a bonding agent for the ferrite particles is particularly advantageous since this increases the adherence of the casing onto a metallic surface and eliminates all possibility of the casing slipping on this surface as it might if it were only held by conventional magnetic means which did not comprise an anti-skid surface or rubber. Since it is impossible for the tape to be magnetized, it is possible to employ very strong magnets, which was not possible in previously known devices. In the said previously known devices deterioration of dust particles was generally harmful since it constituted an additional air gap. With the present construction this is no longer a factor since the rubber vulcanized onto the ferrite itself constitutes an additional air gap.

While the present invention is particularly advantageous for use in conjunction with a measuring tape which is made of a magnetizable material, the same is not limited thereto. Where the tape is of a non magnetizable material, the same may be provided, as shown in FIGURE 1, with a small magnet 9 in the form of a magnetic wafer which can be secured to the tape by gluing, rivetting or any suitable means. The wafer 9 can also be mounted near the extremity or at the extremity it self of the tape. In the latter case, the magnetized wafer would replace hook 5 to prevent the total rewinding of the tape. Thus there is provided a tape measure permitting the securing of the casing or of the extremity of the tape to a metallic element which serves as the origin or as the end of the measurement.

The tape measure according to the invention has the advantage of simple and inexpensive manufacture without serious increase in bulk. As shown treads 14 may be provided on the vulcanized undersurface by using a plate 10 which has slots 16 therein.

What is claimed is:

1. In a tape measure comprising a tape, in particular a metallic tape; a casing adapted to receive said tape wound therein; said casing having an outlet and a base adjacent to said outlet substantially parallel to the direction of said tape as said tape passes out through said outlet, a metallic support on said base, magnetic particles on said support on the side thereof away from said tape and vulcanized rubber securing said particles on said metallic support and forming an anti-skid surface for said casing.

2. Tape measure according to claim 1, wherein said tape measure is non magnetizable and has a wafer-shaped magnet near the free end thereof.

3. Tape measure according to claim 2, wherein said wafer is at the extremity of said tape and serves as the hook normally present at said extremity.

4. Tape measure according to claim 1, wherein said vulcanized rubber is formed in the shape of treads.

5. Tape measure according to claim 1, wherein said magnetic particles are arranged to form a plurality of small magnets having outwardly facing alternate North and South poles, corresponding inner poles of said magnets being shunted by said metallic support.

References Cited

UNITED STATES PATENTS 2,893,655  7/1959  Carlson _____ 242—84.8
3,036,791  5/1962  Siggelkow _____ 242—107

NATHAN L. MINTZ, Primary Examiner